United States Patent [19]

Sassi et al.

[11] Patent Number: 4,776,239
[45] Date of Patent: Oct. 11, 1988

[54] SEMIAUTOMATIC TRANSMISSION

[75] Inventors: Kari Sassi, Lohja; Erkki Tammisto, Helsinki, both of Finland

[73] Assignee: Konejukka Oy, Finland

[21] Appl. No.: 936,345

[22] PCT Filed: Apr. 2, 1986

[86] PCT No.: PCT/FI86/00036

§ 371 Date: Nov. 28, 1986

§ 102(e) Date: Nov. 28, 1986

[87] PCT Pub. No.: WO86/06332

PCT Pub. Date: Nov. 6, 1986

[30] Foreign Application Priority Data

Sep. 24, 1984 [FI] Finland .................................. 844181
Apr. 19, 1985 [FI] Finland .................................. 853695

[51] Int. Cl.⁴ ........................ B60K 41/18; B60K 41/10
[52] U.S. Cl. ......................................... 74/866; 74/335
[58] Field of Search .................... 74/866, 335, 336 R, 74/337; 192/0.052, 0.055

[56] References Cited

U.S. PATENT DOCUMENTS 4,485,443 11/1984 Kuodler et al. .................. 74/866 X
4,616,521 10/1986 Akashi et al. ......................... 74/335
4,621,545 11/1986 Mohl ..................................... 74/866

Primary Examiner—Dirk Wright
Attorney, Agent, or Firm—Steinberg & Raskin

[57] ABSTRACT

The present invention relates to a semiautomatic transmission for vehicles, construction machines or similar equipment. In one embodiment of the invention, the semiautomatic transmission comprises a synchro-mesh transmission which has an electrically controlled gear shift mechanism, an electric control unit, for controlling the gear shift mechanism, and sensors, for measuring the torque of the engine, the rotating speed of the output shaft of the transmission and the driving speed. The sensors are arranged to transmit corresponding to measured quantities to the electric control unit for selecting a gear suiting the actual driving situation. Between the output shaft, of the transmission and the drive shaft, with which the power is transmitted to the drive gear, there is, in accordance with the invention, a bidirectionally engaging overrunning clutch to connect shaft, with each other. The engaging circuit of the transmission is an electric power circuit that is opened and closed by the accelerator pedal of the engine or with a similar power regulator.

19 Claims, 2 Drawing Sheets 4,776,239

SEMIAUTOMATIC TRANSMISSION

BACKGROUND OF THE INVENTION

The present invention relates to a semiautomatic transmission for vehicles, construction machines and similar, which semiautomatic transmission comprises a synchro-mesh transmission, which has an electrically controlled gear shift mechanism, a sensor for measuring the engine torque, and sensors for measuring the rotating speeds of drive line shafts located immediately before the transmission or after the transmission, which sensors transmit signals corresponding to measured quantities to the electric control unit for selecting a gear suiting the actual driving situation.

Semiautomatic transmissions are known in the prior art, and they are widely used in the drive line systems of motor vehicles and similar equipment. Conventional semiautomatic transmissions are arranged in such a way that the clutch and the transmission are specially designed in order to make the clutch pedal or similar unnecessary. On the other hand, these systems have a normal gear shift selector for selecting the desired driving gear. In these systems the clutch and the transmission must be specially designed, and the clutch is usually a kind of centrifugal clutch by which the engagement of the drive line depends on the engine speed of revolutions. Usually there is also a torque converter between the clutch and the transmission for evening up the jerks due to the engagement of the gear thus protecting the transmission. From the point of view of the driver, a conventional system such as this, when installed for instance in a vehicle, differs from a usual manual transmission only in that the clutch pedal has been omitted or that it is not necessary to use the clutch pedal when shifting the gear. Therefore it is the driver of the vehicle who always selects the desired driving gear. Thus the driver must concentrate on the selection of the gear and distract his attention from the actual driving.

SUMMARY OF THE INVENTION

The object of the present invention is to provide a new type of semiautomatic transmission, which eliminates the drawbacks prevalent in the solutions of the prior art. A characteristic feature of the invention is that the transmission is connected with the rest of the drive line with an overrunning clutch and that the engaging circuit of the transmission is an electric power circuit that is opened and closed by means of the accelerator pedal of the engine or with a similar power regulator.

According to the embodiment of the invention the overrunning clutch may engage in both rotating directions (a bidirectionally engaging overrunning clutch), and it is installed between the output shaft of the transmission and the drive shaft, with which the power is transmitted to the driver gear, in order to connect these shafts together, and that said sensors measuring the rotating speeds are installed on the output shaft of the transmission and on the drive shaft for measuring their rotating speeds.

An essential feature of this embodiment is that the electric power circuit of the transmission is arranged to be closed when the rotating speeds of the output shaft of the transmission and the drive shaft differ, in other words when the accelerator pedal is lifted up and the engine power has been essentially reduced, or when the speed of the vehicle, i.e. the rotating speed of the drive shaft is zero, and that at other times said electric power circuit is arranged to be open.

According to another embodiment of the invention, the overrunning clutch is installed between the clutch shaft and the input shaft of the transmission to connect said shafts with each other, and that said sensors measuring the rotating speeds are installed onto the clutch shaft and the input shaft of the transmission to measure the rotating speeds of these shafts.

It is characteristic to this second embodiment of the invention that the electric power circuit of the transmission is arranged to be closed when the rotating speeds of the clutch shaft and the input shaft of the transmission differ, in other words when the accelerator pedal is lifted up and the engine power has been essentially reduced, or when the speed of the vehicle, i.e. the rotating speed of the drive shaft is zero, and that at other time said electric power circuit is arranged to be open.

Several advantages are attained with the invention when compared with the transmission of the prior art. When using a transmission in accordance with the invention, the vehicle is always driven in the optimum gear. Driving at too low or too high revs will be avoided which reduces the wear of the engine and the fuel consumption. The driver of the vehicle may better concentrate on observing the traffic, as he need not "think" about shifting gears, and he need not loosen his hold of the steering wheel. A semiautomatic transmission in accordance with the invention can easily be applied both to front wheel drive and rear wheel drive vehicles, as the overrunning clutch can be installed onto the clutch shaft or onto the drive shaft after transmission. The overrunning clutch may in one embodiment of the invention be a conventional unidirectionally engaging overrunning clutch if the overrunning clutch is installed onto the clutch shaft, because, as we know, the clutch shaft rotates to one direction only. However, in order to provide the possibility of engine braking, a unidirectional clutch must have a locking feature. The overrunning clutch can also be a bidirectionally engaging overrunning clutch for providing engine braking without a separate locking device.

BRIEF DESCRIPTION OF THE DRAWINGS

The invention will now be described by the help of an example with reference to the figures in the accompanying drawing, which schematically illustrate a drive-line system of a vehicle or similar, in which a semiautomatic transmission in accordance with the invention is used.

IN THE DRAWINGS

Figure 1:
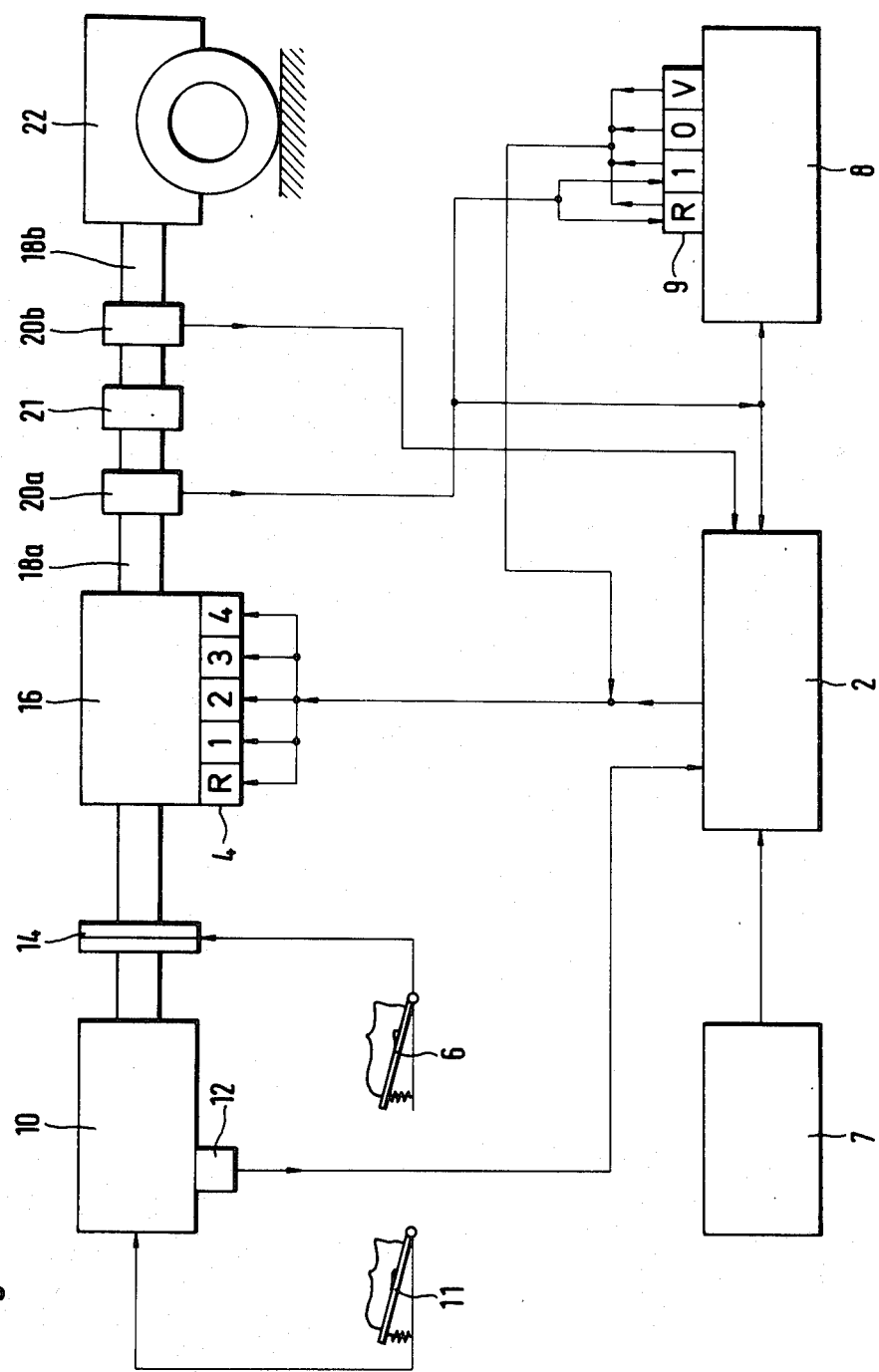

FIG. 1 illustrates a first embodiment of the invention; and

Figure 2:
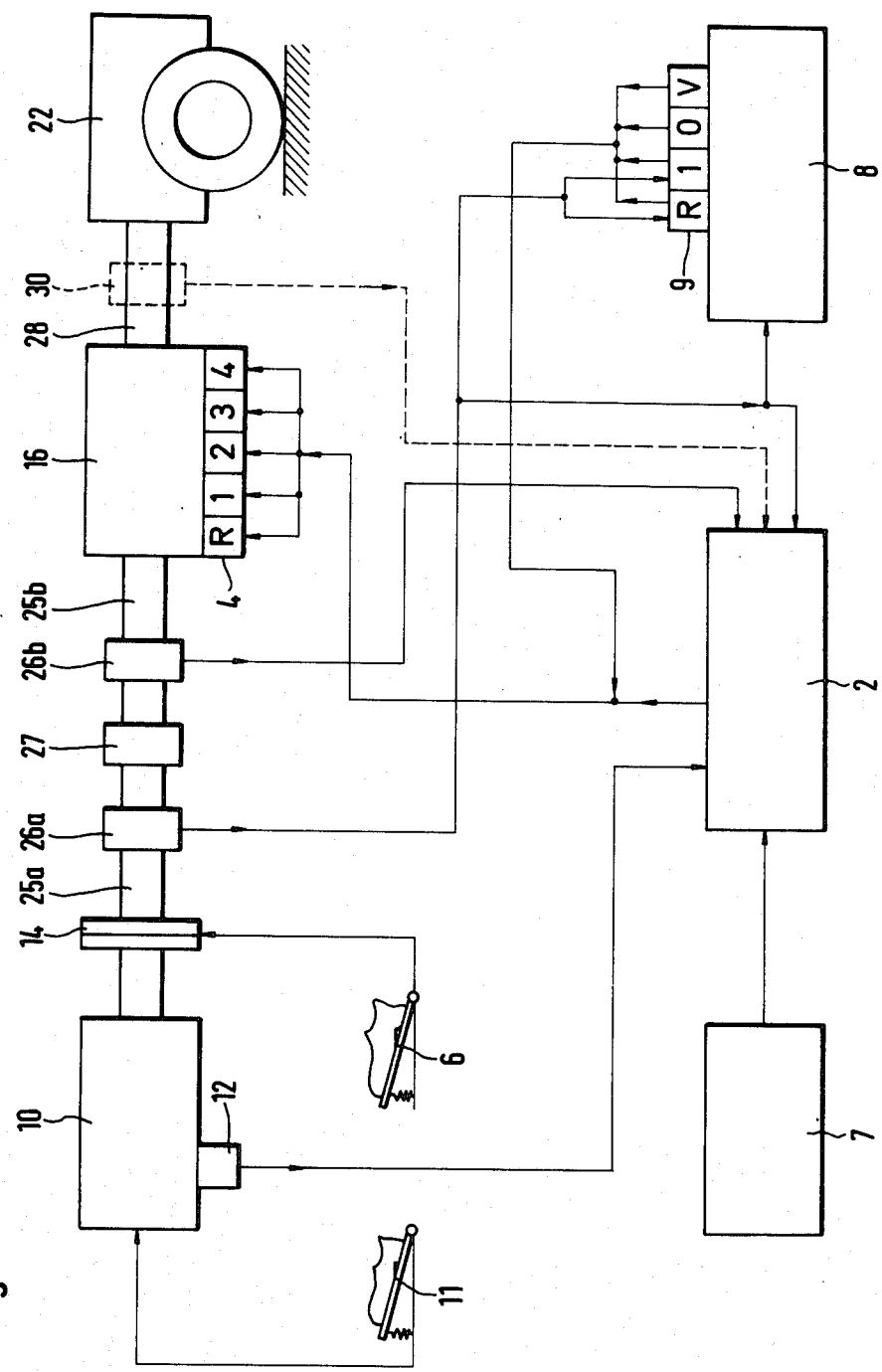

FIG. 2 illustrates a second embodiment of the invention.

DESCRIPTION OF THE PREFERRED EMBODIMENTS

FIG. 1 of the drawing schematically illustrates a drive-line system which comprises a motor 10, a clutch 14, a transmission 16, a two-section drive shaft coming out of the transmission comprising an output shaft 18a of the transmission 16 and a drive shaft 18b, an overrunning clutch 21, and a drive gear 22. The overrunning clutch 21 is bidirectionally engaging, and it is installed between the output shaft 18a of the transmission 16 and drive shaft 18b to connect said shafts 18a and 18b to each other. The clutch 14 is a conventional clutch used in association with manual transmissions, and transmission 16 is quite a normal synchro-mesh transmission. The only difference of the transmission 16 from conventional transmissions is in its shifting mechanism. In a transmission in accordance with the invention, the shifting mechanism 4 is electric or electrically controlled, and the gear shifting elements may be solenoids, linear motors, electrically controlled hydraulic or pneumatic valves or similar.

The power of the engine 10 is regulated in the normal way with a power regulator such as a so-called accelerator pedal 11 or similar, and the engine 10 is also equipped with a sensor 12 that measures the momentary torque of the engine. In association with the output shaft 18a of the transmission 16 there is one sensor 20a, which measures the rotating speed of said output shaft 18a, and in association with the drive shaft 18b there is another sensor 20b, which measures the rotating speed of the drive shaft 18b. The sensor 20b may of course be installed in another suitable place after the output shaft 18a of the transmission 16 and the overrunning clutch 21, where it measures a quantity that is directly proportional to the driving speed of the vehicle. As was said above, the clutch 14 is quite a normal clutch used in the drive line of a motor vehicle and manoeuvred with a clutch pedal 6 or similar.

For engaging gears the transmission is equipped with an electric engaging circuit whose design will be described below. In association with the electric engaging circuit there is an electric control unit 2, which, in the embodiment illustrated in FIG. 1, receives the torque information from the sensor 12 and signals coming from the sensors 20a and 20b carrying information about the rotating speeds of the output shaft 18a of the transmission 16 and the drive shaft 18b. The control unit 2 has a memory for storing necessary set values for the engine torque and the rotation speed of the drive shaft or the driving speed of the vehicle for each gear. The set values are not exact values of the torque and speed but ranges on which the vehicle may operate in different gears. The control unit 2 compares the signals received from sensors 12, 20a and 20b with the set values stored in the memory and transmits a necessary pulse to the shifting mechanism 4 of the transmission 16 for selecting the gear that best suits the current driving situation.

The engaging circuit also comprises a control unit 8 with necessary switches such as keys 9 for manual selection of the driving direction (forward 1, reverse R) and the neutral position V. The keyboard control unit 8 transmits the manually issued instructions into the electric control unit 2, which transmits pulses in accordance with these instructions to the shifting mechanism 4 of the transmission 16. The keyboard control unit 8 also has a switch (key 0) with which it is possible to shift down for instance for fast acceleration. Pushing down key 0 makes the system by-pass the control pulse generated by the electric control unit 2. A power source 7 is of course connected to the engaging circuit for providing the necessary electric power for transmitting the pulses. The special feature of the electric engaging circuit is that in the normal situation the electric power circuit of the engaging circuit is open, which means that the shifting mechanism 4 of the transmission 16 cannot engage a new gear.

The engaging circuit is turned on when one of the sensors 20b reports that the speed of the vehicle is zero or when both sensors 20a and 20b report that the rotating speeds of the output shaft 18a of the transmission 16 and the drive shaft 18b differ. The rotating speeds of the shafts 18a and 18b are different when the drive line is out of gear, i.e. when the accelerator pedal is lifted up. When the accelerator pedal 11 is lifted up, the overrunning clutch 21 disengages the output shaft 18a of the transmission 16 from the drive shaft 18b. Now the electric power circuit of the engaging circuit is closed and the shifting mechanism of the transmission engages a new gear. Therefore, regardless of the driving situation, the driver himself always selects the driving gear by using the accelerator pedal 11.

The drive line system illustrated in FIG. 2 of the drawing is mostly analogous to the one illustrated in FIG. 1, and the same components are referred to by same item numbers. In FIG. 2, the system comprises the engine 10, the clutch 14, a two-section drive shaft between the clutch 14 and the transmission 16 comprising a clutch shaft 25a and an input shaft 25b of the transmission 16, an overrunning clutch 27, the transmission 16, a drive shaft 28 and the drive gear 22. As distinct from the embodiment of FIG. 1, the overrunning clutch may be either of the conventional unidirectional type or bidirectional (engaging to both rotating directions), and it is installed between the clutch shaft 25a and the input shaft 25b of the transmission 16 to connect said shafts 25a and 25b with each other.

If the overrunning clutch 27 is unidirectional (engages in one direction only), it must, in order to provide the possibility of engine braking, have a locking feature. Even in this embodiment the clutch 14 is a conventional clutch in association with manual transmissions, and the transmission 16 is quite a normal synchromesh transmission. The shifting mechanism 4 of the transmission 16 is similar to one illustrated in FIG. 1; also the gear shifting elements are analogous.

In the same way as described in the context of FIG. 1, the engine power is regulated with a power regulator such as a so-called accelerator pedal 11 or similar, and the engine 10 is also equipped with a sensor 12 that measures the momentary torque of the engine. The arrangement of components differs from the embodiment of FIG. 1 in the following way. In association with the clutch shaft 25a there is a third sensor 26a for measuring the rotating speed of said clutch shaft 25a, and in association with the input shaft 25b of the transmission 16 there is a fourth sensor 26b for measuring the rotating speed of the input shaft 25b of the transmission 16. There can be a fifth sensor 30 on the drive shaft 28 or in another suitable place for measuring a quantity that is directly proportional to the driving speed of the vehicle. In FIG. 2 the sensor 30 is indicated with dotted lines. As was said above, the clutch 14 is quite a normal clutch used in the drive line of a motor vehicle and manoeuvred with a clutch pedal 6 or similar.

In the embodiment of FIG. 2, the design of the electric engaging circuit is as follows. In association with the electric engaging circuit there is an electric control unit 2, which receives the torque information from the sensor 12 and signals coming from the sensors 26a and 26b carrying information about the rotating speeds of the drive shaft 25a and the input shaft 26b of the transmission 16 and from the possible sensor 30 measuring the rotating speed of the drive shaft 28. The control unit 2 has a similar memory as in FIG. 1 for storing set values in a way analogous with FIG. 1. The control unit 2 compares the signals received from sensors 12, 26a and 26b and 30 with the set values stored in the memory and transmits a necessary pulse to the shifting mechanism 4 of the transmission 16 for selecting the gear that best suits the current driving situation.

The engaging circuit also comprises a control unit 8 whose design and function are described in the context of FIG. 1. In the embodiment of FIG. 2, the engaging circuit is turned on when the fourth sensor 26b and the fifth sensor 30 report that the speed of the vehicle is zero or when the third and the fourth sensors 26a and 26b report that the rotating speeds of the clutch shaft 25a and the input shaft 25b of the transmission 16 differ. The rotating speeds of shafts 25a and 25b are different when the drive line is out of gear, i.e. when the accelerator pedal is lifted up. When the accelerator pedal 11 is lifted up, the overrunning clutch 27 disengages the clutch shaft 25a from the input shaft 25b of the transmission 16. Now the electric power circuit of the engaging circuit is closed and the shifting mechanism of the transmission engages a new gear. Therefore, also in the case of FIG. 2, the driver himself always selects the driving gear by using the accelerator pedal 11, regardless of the driving situation.

The following is a more detailed description of how a semiautomatic transmission in accordance with the invention works. When starting out a journey, the first thing is, as usually, to turn on the power. When this is done, the keyboard control unit 8 and the electric control unit 2 gets a signal carrying the message that the driving speed is zero. In the embodiment of FIG. 1, this signal is transmitted by the rotating speed sensor 20b, in the embodiment of FIG. 2, this signal comes from the fourth rotation speed sensor 26b and/or the fifth rotation speed sensor 30. This will close the current circuit, and the function pulse transmitted by the electric control unit 2 goes to the shifting mechanism 4 of the transmission 16 which disengages the gear if the transmission has been left in gear (and not in neutral) after last driving. Now the engine 10 can be started.

When beginning to back up the vehicle, the clutch pedal 6 is pressed down in the normal way which disengages the engine 10 from the drive line. The clutch 6 need to be operated only when starting off and stopping, as the overrunning clutch 21 or 27 takes care of the other disengagements of the drive line. After disengaging the engine 10, the driver pushes the key R of the keyboard 9 of the control unit 2. An instruction issued by the key R by-passes the electric control unit 2 and proceeds to the shifting mechanism 4 of the transmission 16 which shifts the transmission to reverse. Now the clutch pedal 6 is lifted up in the normal way and the backing up may start. The backing up is interrupted by pressing down the clutch pedal. When the speed of the vehicle is zero, the electric control unit 2 shifts the transmission to neutral by means of the shifting mechanism 4 of the transmission 16.

When beginning to drive forwards, the procedure is the same as above except that now the driver pushes the key 1 of the keyboard 9 of the control unit 2. If the driving is interrupted by pressing the clutch pedal 6 down and braking the speed of the vehicle to zero, the electric control unit 2 shifts the transmission to neutral. In the embodiment of FIG. 1, if the speed is increased, the electric control unit selects from the shift mechanism 4 of the transmission 16, by signals coming from one rotation speed sensor 20b and the torque sensor 12 and by the information stored in the rotation speed memory, a gear shifting element matching the actual driving speed ready to operate. In the embodiment of FIG. 2, if the speed is increased, the electric control unit selects from the shift mechanism 4 of the transmission 16, by signals coming from the fourth rotation speed sensor 26b and/or the fifth sensor 30 and the torque sensor 12 and by the information stored in the rotation speed memory, a gear shifting element matching the actual driving speed ready to operate.

In the embodiment of FIG. 1, when the accelerator pedal 11 is now lifted, the overrunning clutch disengages the output shaft 18a of the transmission 16 from the drive shaft 18b. This results in a speed difference between said shafts 18a and 18b, which is recorded by the control unit 2 by signals arriving from the sensors 20a and 20b. Said difference in the rotating speeds closes the current circuit which makes the gear shifting element engage the right gear. When the vehicle is being driven, the rotation speed sensor 20a continuously measures the rotating speed of the drive shaft 18b and the torque sensor 12 continuously measures the engine torque, and these sensors transmit appropriate signals to the electric control unit 2 and the keyboard control unit 8.

In association with the keyboard control unit 8 there can favourably be an alarm such as an alarm lamp showing when the gear should be shifted. This alarm lamp does not necessarily need to show which gear is needed; it is enough to show that a wrong gear is on with respect to the driving speed. The situation is corrected by lifting up the accelerator pedal 11, whereat the right gear is immediately engaged. When desired, the electric control unit 2 may be by-passed by means of the key 0 of the keyboard control unit 8, which makes a so-called overtaking gear be engaged. Pushing the 0-key and lifting the accelerator 11 up will shift one gear down, which is often necessary for instance in overtaking situations. Similarly the vehicle can become made coast by shifting to neutral by pushing the key V.

In the embodiment of FIG. 2, if the accelerator pedal is lifted in a similar situation, the overrunning clutch will disengage the clutch shaft 25a from the input shaft 25b of the transmission 16. This results in a rotation speed difference between shafts 25a and 25b, which is recorded by the control unit by means of signals arriving from the third and the fourth sensors 26a and 26b. This difference in rotation speeds closes the electric circuit whereat the correct gear is engaged. When driving, the fourth rotating speed sensor 26b continuously measures the rotating speed of the input shaft 25b of the transmission 16, which speed is, in the ratio determined by the reduction ratio of the transmission, directly proportional to the driving speed, and/or the fifth rotation speed sensor 30 continuously measures the rotating speed of the dirve shaft which is also directly proportional to the driving speed, and the torque sensor 12 measures the engine torsion and transmits appropriate signals to the electric control unit 2 and the keyboard control unit 8. In the embodiment of FIG. 2 too, there can favourably be an alarm device equivalent to the alarm device of the embodiment of FIG. 1.

A system in accordance with the invention can be used in all types of vehicles and construction machines. In heavy equipment such as trucks several alternative rotating speed and torque ranges for the same gear should be stored in the memory of the electric control unit 2. Then the range can be selected according to for instance load, terrain and other conditions. A system in accordance with the invention may be installed afterwards in conventional manual transmissions.

In order to change a conventional manual transmission to a semiautomatic transmission in accordance with the embodiment of FIG. 1, the following must be performed: The engine 10 must be fitted with a torque sensor, and rotating speed sensors must be fitted in association with the output shaft of the transmission and the drive shaft. The output shaft of the transmission and the drive shaft must be connected to each other by means of a bidirectionally engaging overrunning clutch. In order to change the transmission to a semiautomatic transmission in accordance with the embodiment of FIG. 2, the following must be performed: The engine 10 must be equipped with a torque sensor, and rotating speed sensors must be fitted in association with the clutch shaft 25a, the input shaft 25b of the transmission 16 and the drive shaft 28. The clutch shaft and the input shaft of the transmission must be connected to each other with an overrunning clutch.

In addition to this, an electric control unit 2 and a keyboard control unit 8 will be installed and connected to said sensors in accordance with the invention. The normal mechanical shifting mechanism will be removed and replaced with an electrically controlled shifting mechanism in acoordance with the invention. No other changes need be made to conventional transmissions. In a system in accordance with the invention the selection of gears is automated, but the actual shifting is made by the driver by means of the accelerator pedal.

The invention is by no means restricted to embodiments as per the favourable examples described above and illustrated in the figures of the drawings; it may be varied within the framework of the inventional idea as described above.

What is claimed is:

1. A semiautomatic transmission for vehicles, which comprises
    an engine having a drive line,
    a synchromesh transmission which has an electrically controlled gear shift mechanism,
    an electric control unit for controlling said gear shift mechanism,
    a sensor for measuring the torque of the engine, and
    a plurality of sensors for measuring rotating speeds of drive line shafts located immediately adjacent to said transmission, which sensors transmit signals corresponding to measured quantities to said electric control unit for selecting a gear suiting the actual driving situation,
    wherein said transmission is connected with the rest of the drive line through an overrunning clutch,
    an engaging circuit of said transmission is an electric power circuit that is opened and closed by a power regulator,
    said overrunning clutch is bidirectionally-engaging, and
    said electric power circuit is arranged to be closed when power of the engine has been essentially reduced.

2. A semiautomatic transmission in accordance with claim 1, wherein the overrunning clutch is installed between an output shaft of the transmission and a drive shaft constituting said drive line shafts with which the power is transmitted to a driver gear in order to connect these dirve lines shafts together, and
    said sensors measuring the rotating speeds are installed on the output shaft of the transmission and on the drive shaft for measuring the rotating speeds of these shafts.

3. A semiautomatic transmission in accordance with claim 1, wherein the electric power circuit of the transmission is arranged to be closed when one of the following takes place:
    the rotating speeds of an output shaft of the transmission and a drive shaft which constitute said drive line shafts differ, and
    when the rotating speed of the drive shaft is zero, and
    at all other times said electric power circuit is arranged to be open.

4. A semiautomatic transmission in accordance with claim 1, wherein the overrunning clutch is installed between a clutch shaft and an input shaft of the transmission to connect said shafts with each other which constitute said drive line shafts and
    said sensors measuring the rotating speeds are installed onto the clutch shaft and the input shaft of the transmission to measure the rotating speeds of these shafts.

5. A semiautomatic transmission in accordance with claim 1, wherein said overrunning clutch that is bidirectionally engaging provides an engine braking feature.

6. A semiautomatic transmission in accordance with claim 1, wherein a sensor is installed in association with the engaging circuit onto the drive line shaft between the transmission and a drive gear for measuring the driving speed and for transmitting a signal corresponding to the driving speed to said electric control unit.

7. A semiautomatic transmission in accordance with claim 1, wherein the electric power circuit of the transmission is arranged to be closed when one of the following takes place:
    the rotating speeds of a clutch shaft and an input shaft of the transmission which constitute said drive line shafts differ, and
    when the rotating speed of a drive shaft is zero, and
    at all other times said electric power circuit is arranged to be open.

8. The combination of claim 1, wherein said power regulator is an accelerator pedal of said engine.

9. A semiautomatic transmission in accordance with claim 8, wherein the electric control unit is arranged to carry out the selection of gears by comparing the set values of the driving speed and the engine torque stored in its memory to momentary values transmitted by said sensors and by selecting from the shifting mechanism of the transmission a gear matching the driving speed, which gear will be shifted on when the accelerator pedal is lifted up, thus essentially reducing the power of the engine.

10. A semiautomatic transmission in accordance with claim 1, wherein there is a control unit in association with the engaging circuit, which has switches with which a driver, when starting the vehicle, can manually select driving direction, and with which the electric control unit can be by-passed in order to shift to at least one of neutral and at least one step lower gear.

11. A semiautomatic transmission in accordance with claim 10, wherein in association with the control unit, there is an alarm device arranged to give an alarm signal when a gear that does not suit the driving situation is engaged.

12. The combination of claim 1, wherein said shafts are located immediately before said transmission.

13. The combination of claim 1, wherein said shafts are located immediately after said transmission.

14. The combination of claim 8, wherein said electric power circuit is arranged to be closed when said accelerator pedal is lifted up.

15. The combination of claim 3, wherein said electric power circuit is additionally arranged to be closed when speed of the vehicle is zero.

16. The combination of claim 7, wherein said electric power circuit is additionally arranged to be closed when speed of the vehicle is zero.

17. The combination of claim 10, wherein the switches are keys.

18. The combination of claim 11, wherein the alarm device is an alarm lamp.

19. The combination of claim 1, additionally comprising
 a clutch disposed along said drive line between said engine and said transmission, and
 a pedal for the same.

* * * * *